No. 703,532. Patented July 1, 1902.
W. R. BUCHTELA.
CHECK ROW CORN PLANTER.
(Application filed Apr. 17, 1902.)
(No Model.) 2 Sheets—Sheet 1.
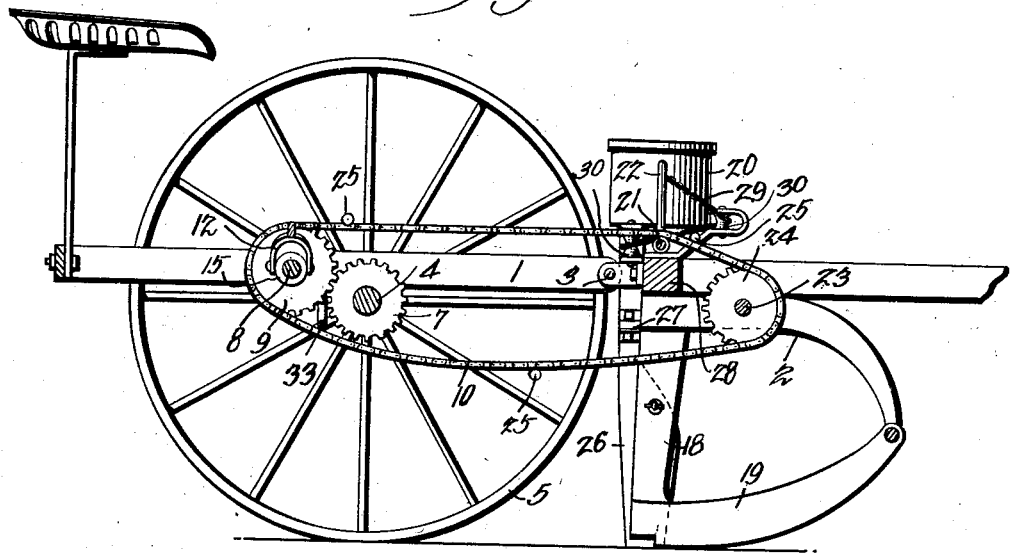
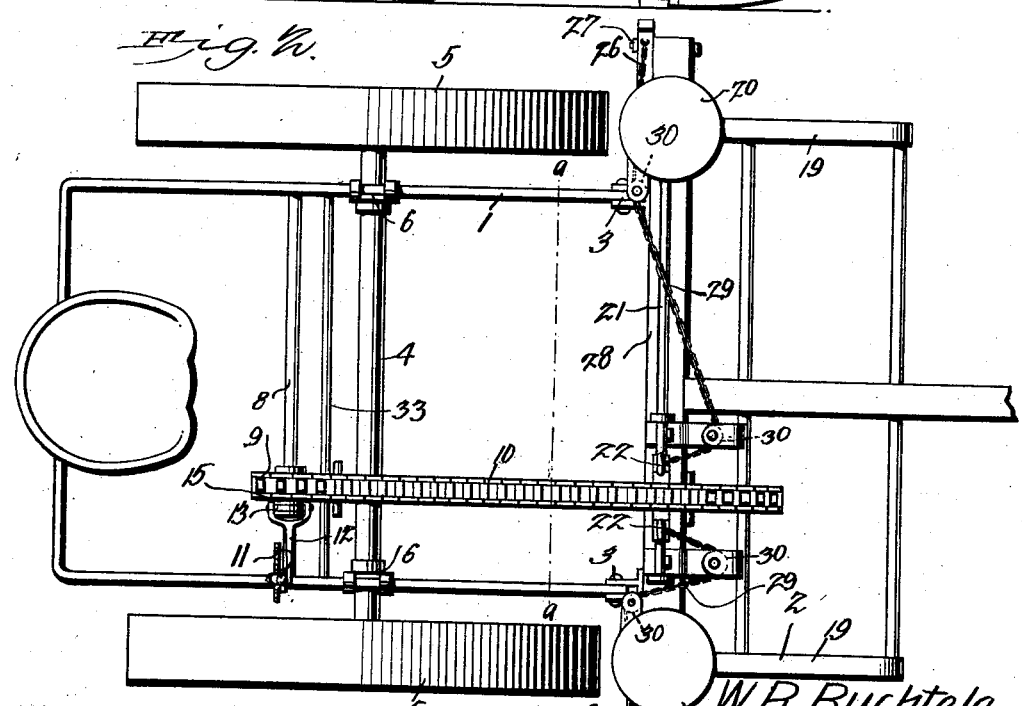

No. 703,532. Patented July 1, 1902.
W. R. BUCHTELA.
CHECK ROW CORN PLANTER.
(Application filed Apr. 17, 1902.)

(No Model.) 2 Sheets—Sheet 2.

Witnesses W. R. Buchtela, Inventor.
by Attorneys

THE NORRIS PETERS CO., PHOTO-LITHO., WASHINGTON, D. C.

UNITED STATES PATENT OFFICE.

WESLEY ROBERT BUCHTELA, OF MARION, IOWA.

CHECK-ROW CORN-PLANTER.

SPECIFICATION forming part of Letters Patent No. 703,532, dated July 1, 1902.

Application filed April 17, 1902. Serial No. 103,444. (No model.)

*To all whom it may concern:*

Be it known that I, WESLEY ROBERT BUCHTELA, a citizen of the United States, residing at Marion, in the county of Linn and State of Iowa, have invented a new and useful Check-Row Corn-Planter, of which the following is a specification.

My invention is an improved check-row corn-planter; and it consists in the peculiar construction and combination of devices hereinafter fully set forth and claimed.

Figure 3:
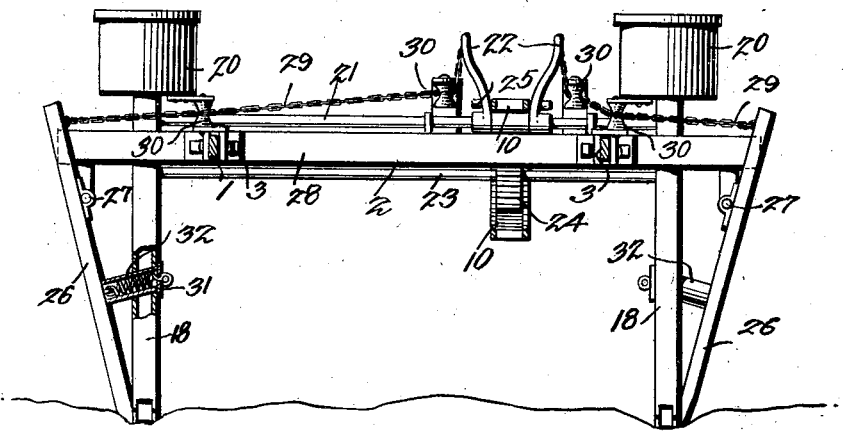
Figure 4:
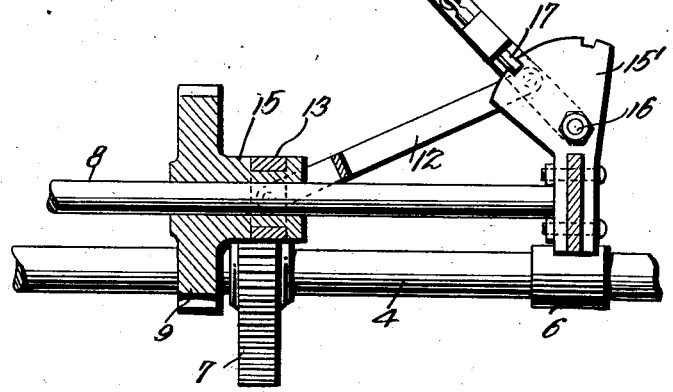

In the accompanying drawings, Figure 1 is a vertical longitudinal sectional view of a check-row corn-planter embodying my improvements. Fig. 2 is a top plan view of the same. Fig. 3 is a transverse sectional view taken on a plane indicated by the line *a a* of Fig. 2 and looking forwardly, and Fig. 4 is a detail sectional view.

The main or wheel frame 1 of the corn-planting machine and the front or runner frame 2, which is hinged thereto, as at 3, may be of any suitable construction. The axle-shaft 4 of the main frame, which shaft is provided with the supporting-wheels 5, is journaled in suitable bearings (indicated at 6) and is provided near one side of the main frame with a spur-wheel 7, which is fast thereon. In rear of and somewhat above the axle-shaft 4 is a shaft 8, on which a spur-wheel 9 revolves, the said spur-wheel being adapted to engage the said spur-wheel 7 and being also adapted to engage an endless sprocket-chain 10. The said wheel 9 is shiftable on the shaft 8, so that it may be engaged with the wheel 7 or disengaged therefrom at will. A hand-lever 11 is fulcrumed at one side of the main frame and is connected by a link 12 to a strap 13, which engages an annular groove made in the collar or hub 15 of the wheel 9, as shown in Fig. 4. Thereby said wheel 9 may be shifted into and out of engagement with the wheel 7, as will be understood. I here show a segment-rack 15' mounted on the main frame 1 and to which the lever 11 is fulcrumed, as at 16, and also show a dog 17, which is carried by the said lever and by means of which the latter may be locked to the segment plate or rack to maintain the wheel 9 either in or out of engagement with the wheel 7.

The runner-frame 2 has the seed-spouts 18, which discharge in the furrows made by the runners or shoes 19, and also carries the usual seed-hoppers 20 and means for dropping the seeds therefrom through the spouts 18 into the furrows. A rock-shaft 21 is mounted for oscillation on the frame 2, and the same has connections (not here shown, as the same constitute no part of my present improvements) with the seed-dropping mechanisms, whereby the latter may be operated by the oscillation of the rock-shaft. The latter has a pair of upstanding rock-arms 22, which are disposed at a suitable distance apart and near one side of the frame 2 and between the seed-hoppers 20. The frame 2 has a shaft 23, on which rotates a sprocket-wheel 24, that is disposed in line with the wheel 7. The endless sprocket-chain 10 connects the wheel 9 with the wheel 24, and the upper lead of said chain passes over the rock-shaft 21 and between the rock-arms 22. The wheel 24 is a guide and carrier for the endless sprocket-chain. The said sprocket-chain carries tappet-bars 25, which are transversely disposed with reference thereto and are disposed at suitable distances apart. The ends of the said tappet-bars extend beyond the sides of the chain, and the rock-arms 22 are disposed in the paths of said bars. It will be understood that when the corn-planter is in motion and the wheel 9 in gear with the wheel 7 the chain will be caused to travel and the tappet-bars thereof will successively engage the rock-arms 22 to partly turn the rock-shaft in one direction, and thereby actuate the seed-dropping mechanisms and cause the seeds at suitable regular intervals to be dropped in the furrows.

It is important in order to cause the seeds to be dropped in check-rows to mark the hills where the seeds are dropped, and I will now describe my improved means for marking the hills.

Marking spades or arms 26 are disposed abreast of and on the outsides of the spouts 18 and are pivotally mounted at suitable distances from their upper ends, as at 27, the bearings 27 being here shown as depending from the outwardly-extended ends of the cross-bar 28 of frame 2, on which the rock-shaft 21 is disposed. Chains or cords 29 connect the upper ends of the said marking spades or arms to the upper ends of the rock-arms 22, the said cords or chains engaging suitable direction-sheaves 30, which are mounted on the said frame 2. Springs 31 are employed to draw the lower ends of said marking spades or arms inwardly and to keep them normally in contact with the lower sides of the grain or seed spouts 18. As here shown, said springs 31 are coiled retractile springs, and the same are disposed in tubular cases 32, which are secured in and pass transversely through the seed-spouts 18. It will be understood that the said springs by drawing the lower ends of the marking spades or arms inwardly cause the said marking-arms, chains or cords 29, and rock-arms 22 to turn the rock-shaft reversely after the latter has been partly turned in one direction by the action of one of the tappet-bars, as hereinbefore described. At each operation of the rock-shaft 21 and the seed-dropping mechanisms actuated thereby to drop the seeds in the furrows the cords or chains 29 are drawn inwardly by the rearwardly-moving rock-arms 22, thereby causing the marking arms or spades to be turned on their pivots so that their lower ends move outwardly from and abreast of the seed-spouts 18 against the tension of the springs 31, and the lower ends of said marking spades or arms by operating in the soil clearly define the location of the hills in which the seeds have been deposited. The shifting wheel 9 enables the corn-dropping mechanism to be appropriately started in operation at the beginning of each row to cause the seeds to be planted in check-rows. A suitable fender 33 may be employed to keep the lower lead of the sprocket-chain from becoming engaged by the wheel 7.

Having thus described my invention, I claim—

1. In a check-row planter, the combination of an axle-shaft, having ground-wheels and a gear-wheel, a shiftable gear mounted for engagement with said axle-gear, means to shift said shiftable gear into and out of engagement with the axle-gear, a guide and carrier, an endless sprocket-chain connecting the shiftable gear and guide and carrier and having a tappet, a rock-shaft to actuate the seed-dropping mechanism and having a rock-arm adapted to be engaged by the tappet, to turn the rock-shaft in one direction, a spring to turn the rock-shaft in the reverse direction, a marker, and connections between the latter and the rock-shaft whereby said marker is operated by the rock-shaft, substantially as described.

2. In a check-row planter, the combination of an axle-shaft, having ground-wheels and a gear-wheel, a shiftable gear mounted for engagement with said axle-gear, means to shift said shiftable gear into and out of engagement with the axle-gear, a guide and carrier, an endless sprocket-chain connecting the shiftable gear and guide and carrier and having a tappet, a rock-shaft to actuate the seed-dropping mechanism, and having a rock-arm adapted to be engaged by the tappet, to turn the rock-shaft in one direction, a spring-retracted marker, and a flexible connection between the latter and the rock-arm whereby said rock-shaft and marker are simultaneously operated, substantially as described.

In testimony that I claim the foregoing as my own I have hereto affixed my signature in the presence of two witnesses.

WESLEY ROBERT BUCHTELA.

Witnesses:
ORA CLOGSTON,
WILLIAM L. GARRISON.